(12) United States Patent
Tatara et al.

(10) Patent No.: US 7,556,409 B2
(45) Date of Patent: Jul. 7, 2009

(54) LIGHTING DEVICE FOR VEHICLE AND OPTICAL AXIS REGULATING DEVICE OF LIGHTING DEVICE FOR VEHICLE

(75) Inventors: Naohisa Tatara, Shizuoka (JP); Masahiro Kusagaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/924,377

(22) Filed: Oct. 25, 2007

(65) Prior Publication Data
US 2008/0112181 A1 May 15, 2008

(30) Foreign Application Priority Data
Nov. 13, 2006 (JP) .............................. 2006-306788

(51) Int. Cl.
*F21V 21/28* (2006.01)
(52) U.S. Cl. ..................... 362/465; 362/464; 362/523
(58) Field of Classification Search ............. 362/39–41, 362/43, 269–276, 460, 465, 467, 468, 469, 362/507, 523–532, 538
See application file for complete search history.

(56) References Cited

U.S. PATENT DOCUMENTS

| 6,799,876 B2 * | 10/2004 | Ravier .................... 362/524 |
| 7,036,964 B2 * | 5/2006 | Takii et al. .................. 362/465 |
| 7,175,319 B2 * | 2/2007 | Tajima et al. ............... 362/465 |
| 7,364,331 B2 * | 4/2008 | Tajima ........................ 362/509 |
| 7,387,415 B2 * | 6/2008 | Tajima et al. ............... 362/513 |

FOREIGN PATENT DOCUMENTS

| JP | 2003-54310 | 2/2003 |
| JP | 2005-119463 | 5/2005 |
| JP | 2005-186731 | 7/2005 |

OTHER PUBLICATIONS

Patent Abstracts of Japan, for Japanese Patent Application No. 2003-054310, Publication Date: Feb. 26, 2003, 2 pages.
Patent Abstracts of Japan, for Japanese Patent Application No. 2005-119463, Publication Date: May 12, 2005, 2 pages.
Patent Abstracts of Japan, for Japanese Patent Application No. 2005-186731, Publication Date: Jul. 14, 2005, 2 pages.

* cited by examiner

*Primary Examiner*—Hargobind S Sawhney
(74) *Attorney, Agent, or Firm*—Osha • Liang LLP

(57) ABSTRACT

An optical axis regulating device of a lighting device for a vehicle, which serves to vertically and transversely tilt a lamp unit supported on one fulcrum in a lamp housing formed by a lamp body having a concave portion and a transparent cover for covering an opening portion of the lamp body, includes a case, a slider movable in a longitudinal direction with respect to the case, an output portion rotatably supported on the slider and coupled to the lamp unit, a vertical regulating device for moving the slider in a longitudinal direction, and a transverse regulating device for rotating the output portion.

9 Claims, 7 Drawing Sheets

LIGHTING DEVICE FOR VEHICLE AND OPTICAL AXIS REGULATING DEVICE OF LIGHTING DEVICE FOR VEHICLE

This application claims foreign priority from Japanese Patent Application No. 2006-306788 filed on Nov. 13, 2006, the entire contents of which are hereby incorporated by reference.

BACKGROUND OF THE INVENTION

1. Field of the Invention

The present invention relates to a novel lighting device for a vehicle and a novel optical axis regulating device of the lighting device for a vehicle. More specifically, the invention relates to a technique capable of independently carrying out a change in a vertical direction and a change in a transverse direction of an irradiating direction and reducing cost and size.

2. Related Art

Some lighting devices for a vehicle, for example, some headlamps for a car can change an irradiating direction into vertically and transversely optional directions.

In a lighting device for a vehicle described in Patent Document 1, a lamp unit is supported on a bracket, and the bracket is tilted transversely and vertically, More specifically, a transverse tilting actuator is driven to transversely tilt the bracket, and, furthermore, a vertical driving actuator is driven to vertically tilt the bracket.

In a lighting device for a vehicle described in Patent Document 2, a rotation in a transverse direction and a rotation in a vertical direction are carried out by one actuator.

Also, in a lighting device for a vehicle described in Patent Document 3, a rotation in a transverse direction and a rotation in a vertical direction are carried out by one actuator.

[Patent Document 1] JP-A-2005-119463 Publication
[Patent Document 2] JP-A-2005-186731 Publication
[Patent Document 3] JP-A-2003-054310 Publication In the lighting device for a vehicle described in the Patent Document 1, however, a transverse tilting actuator for transversely tilting a bracket and a vertical tilting actuator for vertically tilting the bracket are provided separately, and the number of components and required man-hours for assembly are large and a large number of harnesses for supplying power to each actuator and controlling the actuator are required. Consequently, cost is increased. Referring to left and right lighting devices, moreover, the actuator cannot be common. Also, in this respect, cost is increased.

In the lighting device for a vehicle described in the Patent Document 2, a coupling point to the bracket for a transverse tilt of the actuator is separated from a coupling point to the bracket for a vertical tilt, and mutual positional relationships are fixed. For this reason, there is no versatility and a bracket designed for the actuator is required. In addition, special actuators for left and right lighting devices are required respectively.

In the lighting device for a vehicle described in the Patent Document 3, one output portion is provided for the actuator and a common actuator to left and right lighting devices can be used. However, a tilt in the transverse direction and that in the vertical direction cannot be carried out independently at the same time.

SUMMARY OF THE INVENTION

In one or more embodiments of the present invention, a change in a vertical direction and a change in a transverse direction of an irradiating direction is enabled to be independently carried out at the same time and cost and size are reduced.

One or more embodiments of the present invention provides an optical axis regulating device of a lighting device for a vehicle, which serves to vertically and transversely tilt a lamp unit supported on one fulcrum in a lamp housing formed by a lamp body having a concave portion and a transparent cover for covering an opening portion of the lamp body, comprising a case, a slider movable in a longitudinal direction with respect to the case, an output portion rotatably supported on the slider and coupled to the lamp unit, vertical regulating means for moving the slider in the longitudinal direction, and transverse regulating means for rotating the output portion.

Moreover, one or more embodiments of the invention provides a lighting device for a vehicle, which serves to support one of an upper end and a lower end of the lamp unit, wherein the lamp unit comprises a light source and serves to forward irradiate light of the light source, wherein the optical axis regulating device is disposed in the lamp housing, wherein the other one of the upper end and the lower end of the lamp unit is coupled to the output portion.

In one or more embodiments of the invention, accordingly, it is possible to independently carry out a change in a vertical direction and a change in a transverse direction of an irradiating direction at the same time. Moreover, the lamp unit is supported tiltably in the vertical and transverse directions on one fulcrum in the lamp housing. Therefore, it is possible to decrease the number of components for supporting the lamp unit, thereby reducing cost and size.

One or more embodiments of invention provides an optical axis regulating device of a lighting device for a vehicle, which serves to vertically and transversely tilt a lamp unit supported on one fulcrum in a lamp housing formed by a lamp body and a transparent cover for covering an opening portion of the lamp body, comprising a case, a slider movable in a longitudinal direction with respect to the case, an output portion rotatably supported on the slider and coupled to the lamp unit, vertical regulating means for moving the slider in the longitudinal direction, and transverse regulating means for rotating the output portion.

In the optical axis regulating device of a lighting device for a vehicle according to one or more embodiments of the invention, accordingly, it is possible to independently carry out a change in a vertical direction and a change in a transverse direction of an irradiating direction at the same time. Moreover, the lamp unit is supported tiltably in the vertical and transverse directions on one fulcrum in the lamp housing. Therefore, it is possible to decrease the number of components for supporting the lamp unit, thereby reducing cost and size.

According to a second aspect of one or more embodiments of the invention, the transverse regulating means is a gear member supported on the slider rotatably around an axis which is orthogonal to a rotation axis of the output portion and mated with a gear portion formed in the output portion. Therefore, it is possible to independently change the irradiating direction of the lamp unit into the transverse direction. Moreover, it is possible to reduce a weight of the slider.

According to a third aspect of one or more embodiments of the invention, the vertical regulating means is a ball screw member extended in a longitudinal direction of the vehicle, rotatably supported on the case, and screwed into a screw hole formed on the slider. Therefore, it is possible to independently change the irradiating direction of the lamp unit into the vertical direction.

According to a fourth aspect of one or more embodiments of the invention, the ball screw member is moved in the longitudinal direction of the vehicle by means of a driving source to be driven by a manual and/or automatic operation from a remote place. Therefore, it is possible to independently change the irradiating direction of the lamp unit into the vertical direction.

One or more embodiments of invention provides a lighting device for a vehicle, which serves to support one of an upper end and a lower end of the lamp unit, wherein the lamp unit comprises a light source and serves to forward irradiate light of the light source, wherein the lamp unit is disposed in the lamp housing, and wherein the other one of the upper end and the lower end of the lamp unit is coupled to the output portion.

In a lighting device for a vehicle according to one or more embodiments of the invention, accordingly, it is possible to independently carry out a change in the vertical direction and a change in the transverse direction of the irradiating direction. Moreover, the lamp unit is supported tiltably in the vertical and transverse directions on one fulcrum in the lamp housing. Therefore, it is possible to decrease the number of components for supporting the lamp unit, thereby reducing cost and size.

Other aspects and advantages of the invention will be apparent from the following description and the appended claims.

DETAILED DESCRIPTION OF THE EXEMPLARY EMBODIMENTS

The best mode for executing a lighting device for a vehicle and an optical axis regulating device of the lighting device for a vehicle according to the invention will be described below with reference to the drawings. In all embodiments which will be described below, embodiments of the invention are applied to a headlamp for a car and an optical axis regulating device of the headlamp for a car.

Figure 1:
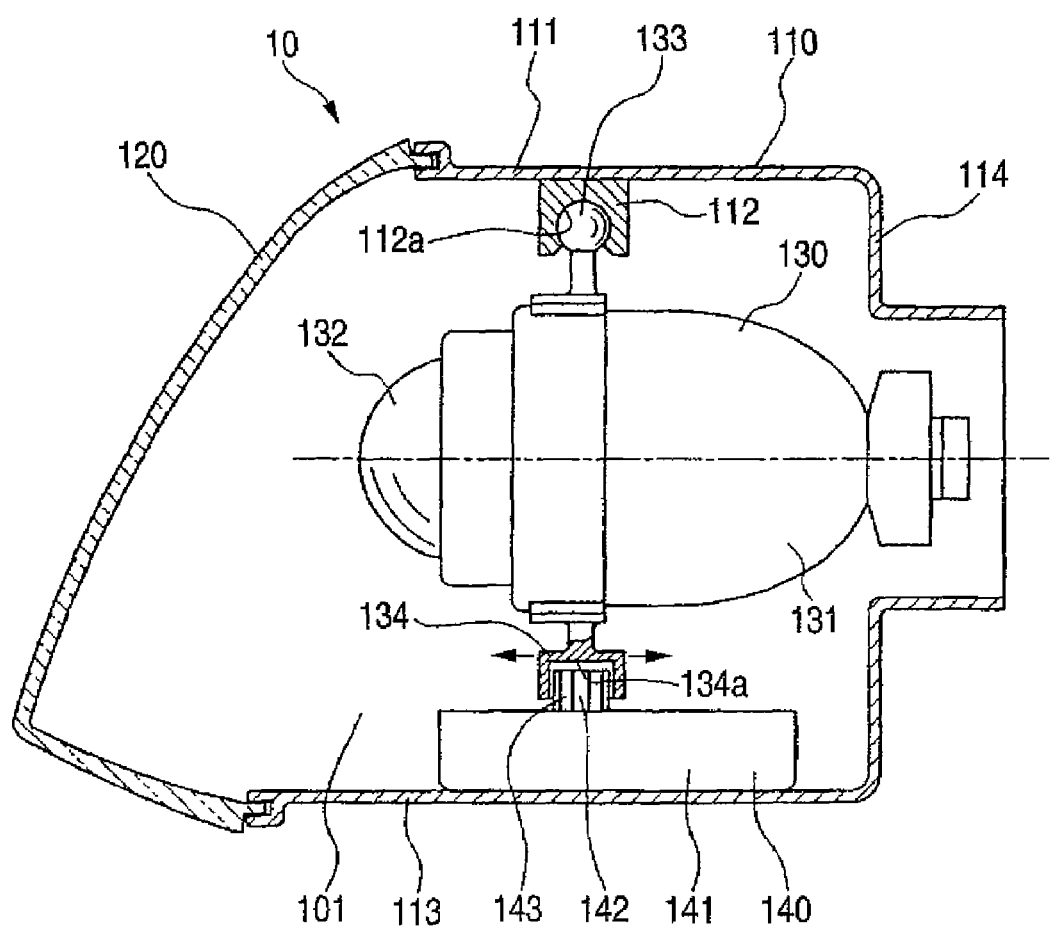
FIG. 1 is a schematic longitudinal sectional view showing a headlamp for a car according to a first embodiment of the invention together with FIG. 2.
Figure 2:
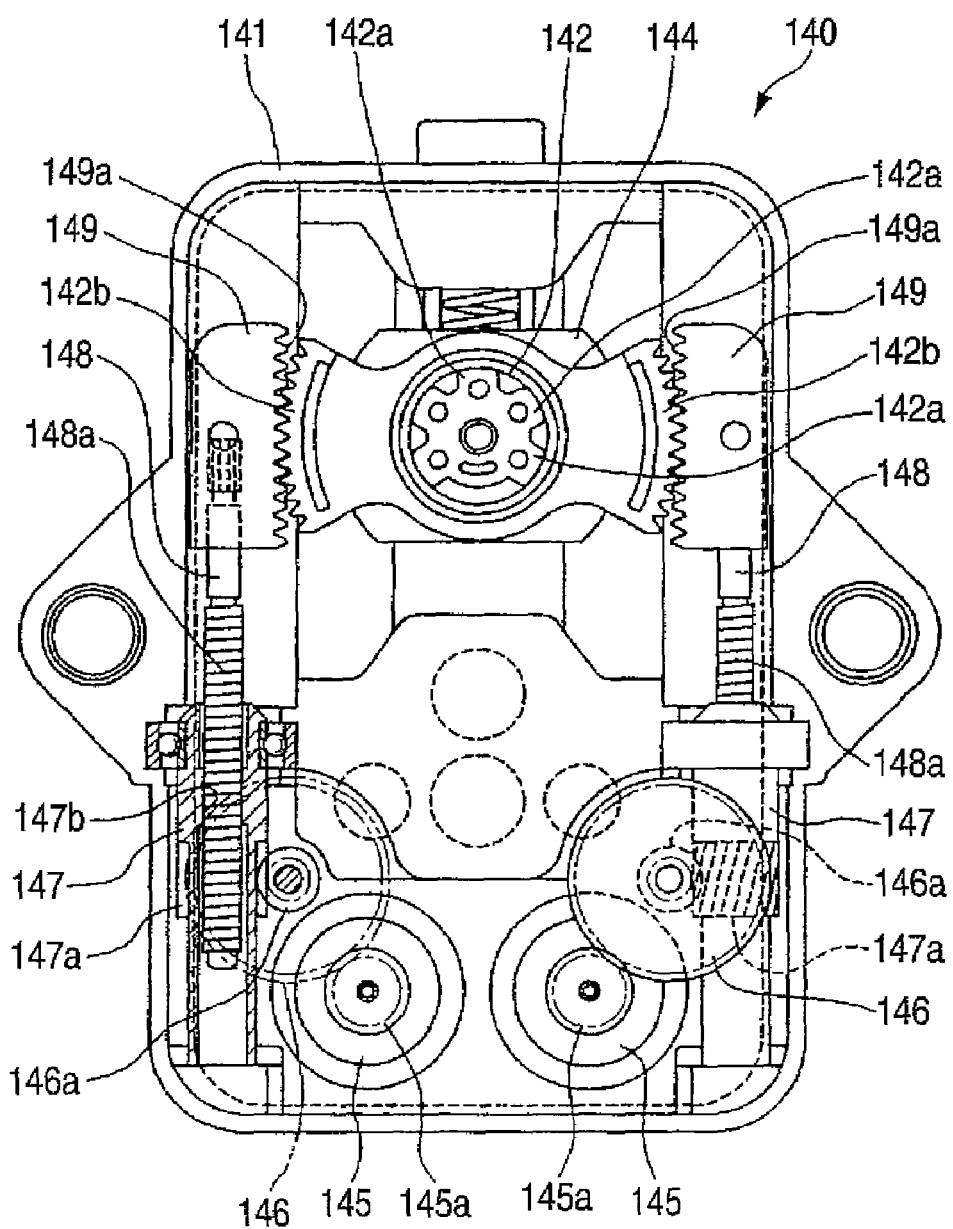
FIG. 2 is a plan view showing an internal structure of an actuator, a part of which is taken away.
Figure 3:
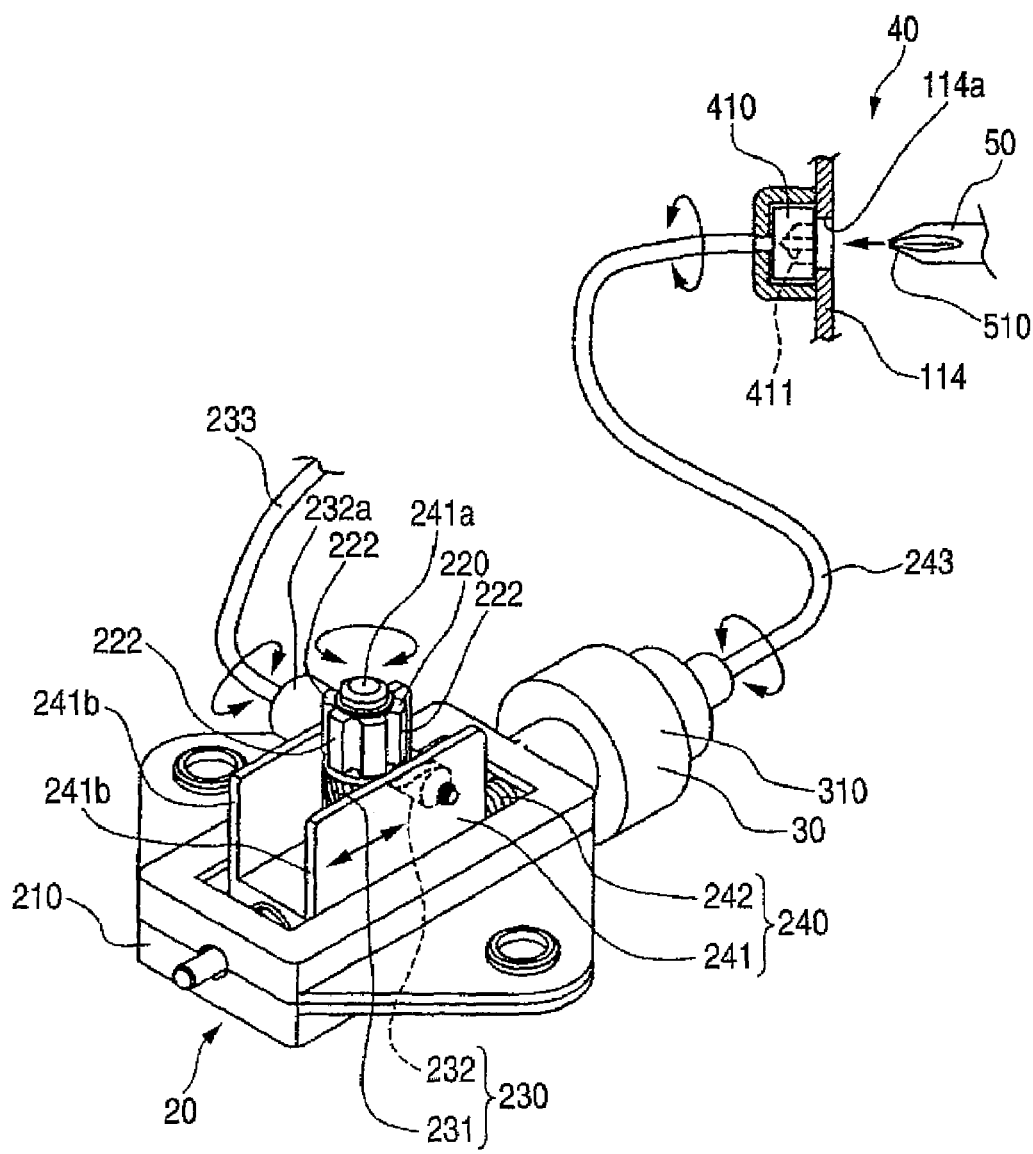
FIG. 3 is a schematic perspective view showing a second embodiment of the actuator together with FIGS. 4 to 6.
Figure 4:
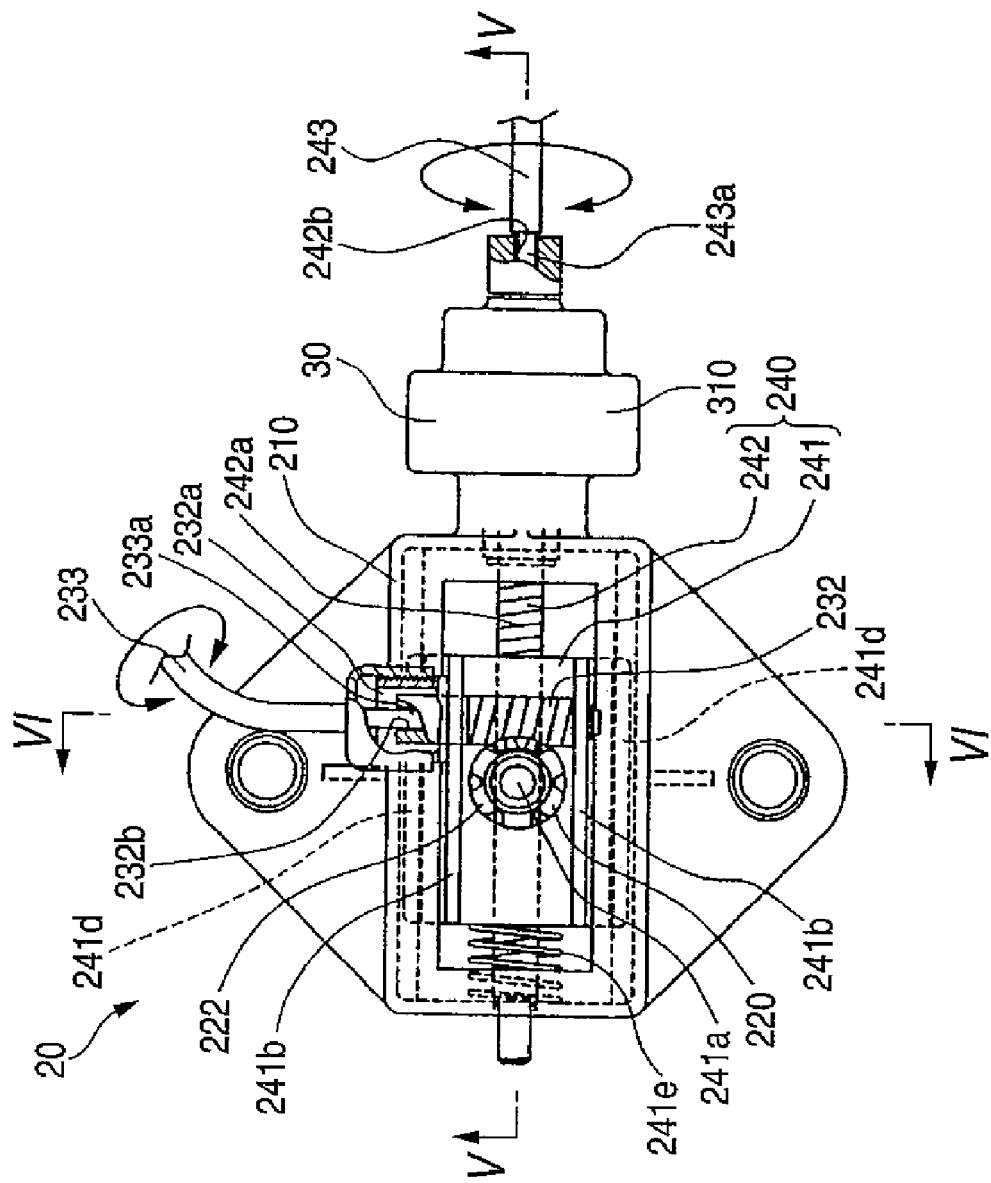
FIG. 4 is a schematic plan view.
Figure 5:
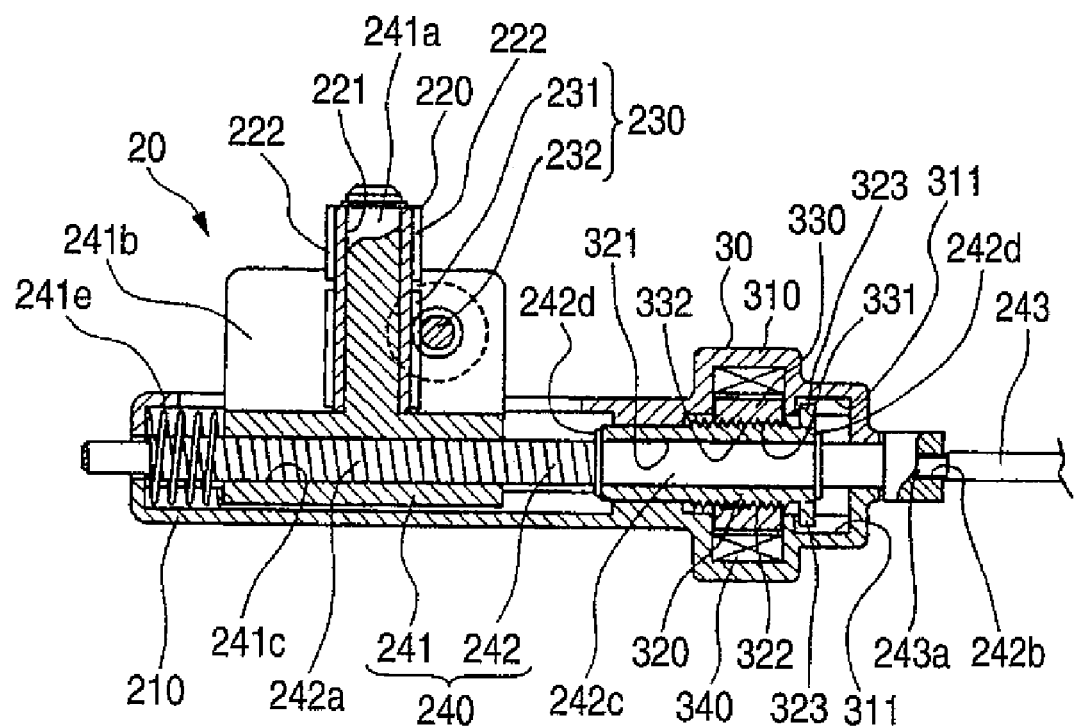
FIG. 5 is a sectional view taken along a V-V line in FIG. 4.
Figure 6:
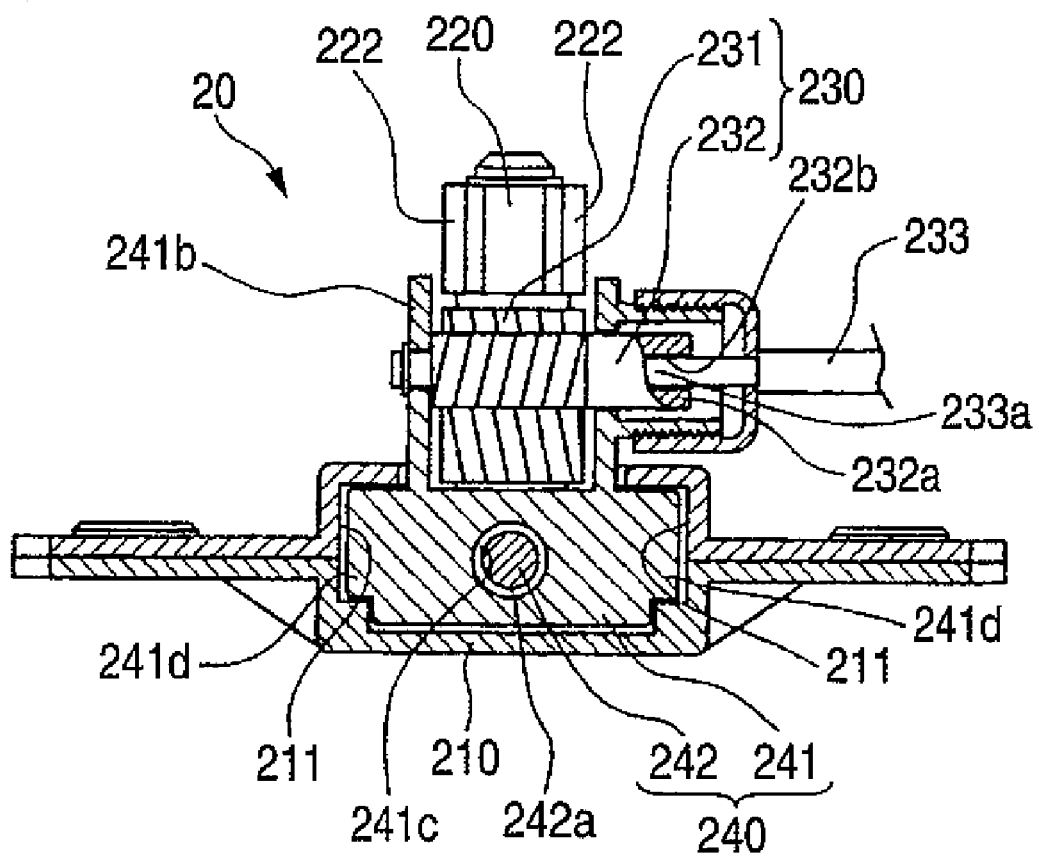
FIG. 6 is a sectional view taken along a VI-VI line in FIG. 4.

FIGS. 1 and 2 show a first embodiment according to the invention.

A headlamp 10 for a car includes a lamp body 110 having a concave portion opened forward, and a front opening of the lamp body 110 is covered with a transparent cover 120 so that a lamp housing 101 is formed. A lamp unit 130 is supported in the lamp housing 101 tiltably in vertical and transverse directions. Furthermore, an actuator 140 is disposed as an optical axis regulating device for tilting the lamp unit 130 in the vertical and transverse directions in the lamp housing 101.

The lamp unit 130 includes at least a reflector 131, a projection lens 132 and a light source which is not shown, and serves to irradiate an illumination light forward. A body coupling portion 133 to be coupled to the lamp body 110 is formed on an upper end of the lamp unit 130, and furthermore, an actuator coupling portion 134 to be coupled to the actuator 140 is formed on a lower end of the lamp unit 130. In the embodiment, the body coupling portion 133 is formed as a sphere constituting a part of a ball joint portion. Moreover, the actuator coupling portion 134 is formed like a thick disk and has a lower surface provided with an opened coupling concave portion 134a, and an engaging groove extended in a vertical direction (not shown) is formed on an inner peripheral surface of the coupling concave portion 134a.

A lamp unit coupling portion 112 is formed on a lower surface of an upper surface portion 111 of the lamp body 110. The lamp unit coupling portion 112 is formed as a ball receiving member constituting a part of the ball joint portion. The ball receiving member 112 has an opened spherical concave portion 112a formed on a lower surface. The sphere (body coupling portion) 133 formed on the lamp unit 130 is internally fitted in the spherical concave portion 112a so that a ball joint is formed therein. When the sphere (body coupling portion) 133 is rotated in the spherical concave portion 112a, the lamp unit 130 can be tilted in the vertical and transverse directions.

The actuator 140 has an output portion 142 protruded upward from an upper surface of a case 141. The output portion 142 is driven by a driving source constituted in the case 141. The output portion 142 is formed as an output shaft and has an outer peripheral surface provided with engaging convex bars 143, 143, . . . extended in an axial direction. The output portion 142 is rotated around a rotating axis extended in an almost vertical direction according to a driving manner of a driving source constituted in the case 141, and furthermore, is moved in a longitudinal direction by another driving manner of the driving source. In this specification, the longitudinal direction implies a longitudinal direction of a car into which the headlamp 10 for a car is loaded, and similarly, the transverse direction implies a transverse direction of the car.

The actuator 140 is fixed into an upper surface of a lower surface portion 113 of the lamp body 110, and the output portion 142 is fitted in the coupling concave portion 134a provided on the lower end of the lamp unit 130. The engaging convex bars 143, 143 . . . formed on an outer peripheral surface of the output portion 142 are engaged with an engaging groove (not shown) formed on an inner peripheral surface of the coupling concave portion 134a so that slip can be prevented from being generated in a rotating direction between the output portion 142 and the coupling concave portion 134a.

In the headlamp 10 for a car, when the output portion 142 of the actuator 140 is rotated around a rotating axis extended in an almost vertical direction, the actuator coupling portion 134 fitting the output shaft 142 therein receives a rotating force around an axis extended in an almost vertical direction. Accordingly, the lamp unit 130 having the actuator coupling portion 134 formed thereon is rotated in the transverse direction. Consequently, an irradiating direction of the lamp unit 130 is changed in the transverse direction. When the output portion 142 of the actuator 140 is moved in the longitudinal direction, moreover, the actuator coupling portion 134 provided on the lower end is displaced in the longitudinal direction in a state in which a position in the longitudinal direction of the body coupling portion 133 provided on the upper end of the lamp unit 130 is fixed. Therefore, the lamp unit 130 is tilted in the vertical direction. Consequently, the irradiating direction of the lamp unit 130 is changed in the vertical direction.

Accordingly, the driving source of the actuator 140 is driven by a manual operation at a driver's seat or an automatic operation based on a result of detection obtained by detecting means for detecting a tilt of a car body through various sensors such as an axle sensor for detecting a height of an axle, for example. Consequently, it is possible to change the irradiating direction of the lamp unit 130 in the vertical and transverse directions at any time during running.

In a delivery from a factory or an automobile inspection, moreover, it is possible to carry out an aiming regulation, that is, an initial regulation of a light distribution by driving the actuator 140 while visually observing a pattern to be irradiated on a forward screen or automatically measuring an illuminance at each measuring point on the screen.

While the lamp unit 130 is coupled to the lamp body 110 by means of the ball joint in the embodiment, the lamp unit and the lamp body may be coupled to each other by means of a spring material such as a plate spring or a coil spring and the lamp unit may be tiltable in the vertical and transverse directions with respect to the lamp body by setting the coupling point as a fulcrum. Consequently, a coupling structure of the lamp unit to the lamp body can be simpler.

Next, the details of the actuator 140 will be described with reference to FIG. 2.

A slider 144 is supported in the case 141 of the actuator 140 movably in a longitudinal direction, and the output portion 142 is rotatably supported on the slider 144. The output portion 142 is provided with sector gear portions 142b and 142b which are protruded in a transverse direction.

Two motors 145 and 145 are disposed as driving sources in the case 141, and worn gears 146a and 146a are formed integrally with transmission gears 146 and 146 to be rotated by driving gears 145a and 145a of the motors 145 and 145.

Furthermore, cylindrical gears 147 and 147 are rotatably supported in the case 141, and bevel gears 147a and 147a are formed on outer peripheral surfaces of the cylindrical gear 147 and 147. Moreover, screw grooves 147b and 147b are formed on central holes of the cylindrical gears 147 and 147. The worm gears 146a and 146a of the transmission gears 146 and 146 are mated with the bevel gears 147a and 147a of the cylindrical gears 147 and 147, when the motors 145 and 145 are rotated, accordingly, the cylindrical gears 147 and 147 are rotated.

Screw shaft portions 148a and 148a of transmitting members 148 and 148 having portions excluding front end portions as the screw shaft portions 148a and 148a are screwed into the screw grooves 147b and 147b of the cylindrical gears 147 and 147. When the cylindrical gears 147 and 147 are rotated, accordingly, the screw shaft portions 148a and 148a are fed by the screw grooves 147b and 147b. Therefore, the transmitting members 148 and 148 are moved in a longitudinal direction.

The front ends of the transmitting members 148 and 148 are fixed to rack members 149 and 149. Rack teeth 149a and 149a formed on the rack members 149 and 149 are mated with sector gear portions 142a and 142a of the output portion 142.

In the actuator 140, in the case in which two motors 145 and 145 are driven in opposite directions to each other when the output portion 142 is to be rotated, one of the rack members 149 is moved forward and the other rack member 149 is moved rearward. Therefore, the output portion 142 is rotated. When the two motors 145 and 145 are driven in the same direction, moreover, the two rack members 149 and 149 are moved in the same direction. Therefore, the output portion 142 is moved forward or rearward.

FIGS. 3 to 6 show a second embodiment of the actuator.

An actuator 20 has an output portion 220 protruded upward from a case 210, and the output portion 220 is rotated around an axis extended in an almost vertical direction and is provided movably in a longitudinal direction. A rotation driving mechanism 230 for rotating the output portion 220 around an axis extended in an almost vertical direction and a horizontal driving mechanism 240 for moving the output portion 220 in the longitudinal direction are constituted in the case 210.

The output portion 220 takes an almost cylindrical shape and has a central hole 221 penetrating through a center. Moreover, engaging convex bars 222, 222, . . . extended in an axial direction are protruded from an almost upper half part of an outer peripheral surface of the output portion 220. Moreover, a gear tooth is formed in an almost lower half part of the outer peripheral surface of the output portion 220 and is set to be a wheel gear portion 231.

A slider 241 is provided in the case 210 movably in a longitudinal direction. The slider 241 is provided with a support shaft 241a protruded upward from an almost center and support walls 241b and 241b extended in a longitudinal direction in a position placed slightly apart from the support shaft 241a in a transverse direction. Moreover, a screw hole 241c is formed to penetrate in a longitudinal direction. In the slider 241, engaging convex pieces 241d and 241d protruded from left and right side surfaces of the slider 241 are slidably engaged with guide grooves 211 and 211 formed on left and right internal side surfaces of the case 210 in an extension in the longitudinal direction. Consequently, the slider 241 is supported movably in the longitudinal direction in the case 210.

The support shaft 241a of the slider 241 is inserted through the central hole 221 so that the output portion 220 is rotatably supported on the slider 241.

A worm gear 232 is rotatably supported between the support walls 241b and 241b of the slider 241, and the worm gear 232 is mated with the wheel gear portion 231 of the output portion 220. When the worm gear 232 is rotated, accordingly, the output shaft 220 is rotated. The worm gear 232 is provided with a coupling portion 232a protruded outward from one of the support walls 241b and 241b, and a coupling hole 232b opened to an end face and having a rectangular section is formed on the coupling portion 232a. The rotation driving mechanism 230 is constituted by the worm gear 232 and the wheel gear portion 231 formed on the output portion 220.

A horizontal driving shaft 242 is provided to longitudinally penetrate through the case 210, and a screw piece 242a formed on an outer peripheral surface of the horizontal driving shaft 242 is screwed into the screw hole 241c of the slider 241. Accordingly, the screwhole 241c of the slider 241 is fed through the screw piece 242a of the horizontal driving shaft 242 by a rotation of the horizontal driving shaft 242 and the horizontal driving shaft 242 is moved in a longitudinal direction with respect to the case 210 so that the slider 241 is moved in the longitudinal direction with respect to the case 210. Therefore, the output portion 220 supported on the slider 241 is moved in the longitudinal direction with respect to the case 210. The horizontal driving mechanism 240 is constituted by the horizontal driving shaft 242 and the slider 241. A compression coil spring 241e is inserted between the slider 241 and an internal surface of a front end of the case 210, and thus a looseness of the slider 241 can be prevented.

The horizontal driving shaft 242 is rotated and longitudinally moved as a driving shaft of a leveling driving portion 30 coupled to a rear end of the actuator 20.

The leveling driving portion 30 is set into such a state that a case 310 thereof is coupled integrally with a rear end of the case 210 of the actuator 20.

The screw piece 242a is formed to be a screw shaft in a portion placed in a tip portion of the horizontal driving shaft 242, that is, the case 210 of the actuator 20, and a rear end is set to be a coupling portion and a coupling hole 242b opened to the rear end and having an almost rectangular section is formed. Moreover, an intermediate portion 242c provided between the screw shaft portion and the rear end is set to be a supported portion taking a shape of a round bar.

The case 310 includes a cylindrical member 320, a rotor 330 and a stator 340 which are disposed concentrically around the horizontal driving shaft 242.

The cylindrical member 320 provided in the case 310 takes an almost wholly cylindrical shape and has a central hole 321 and a screw piece 322 is formed in a central part of an outer peripheral surface thereof, and furthermore, detent projections 323 and 323 protruded vertically are formed integrally with a rear end.

The horizontal driving shaft 242 is inserted into the central hole 321 of the cylindrical member 320 from a rear part thereof, and furthermore, washers 242d and 242d are externally fitted in a portion of the horizontal driving shaft 242 which is longitudinally protruded from the cylindrical member 320 so as to abut on the cylindrical member 320. Consequently, the horizontal driving shaft 242 is supported rotatably with respect to the cylindrical member 320 and immovably in an axial direction thereof.

The rotor 330 also takes an almost wholly cylindrical shape, and has a screw groove 332 formed on a central hole 331 having an almost equal inside diameter to an outside diameter of the cylindrical member 320 and is rotatably supported on the case 310. A plurality of permanent magnets (not shown) is attached as rotor magnets in an outer peripheral portion of the rotor 330.

The stator 340 has a plurality of stator coils (not shown) corresponding to the rotor magnets and is fixedly disposed along an internal peripheral surface of the case 310.

The cylindrical member 320 supporting the horizontal driving shaft 242 as described above is set into such a state that the cylindrical member 320 is inserted into the central hole 331 of the rotor 330 from a rear part thereof to screw the screw piece 322 into the screw groove 332. The horizontal driving shaft 242, the cylindrical member 320 and the rotor 330 are disposed in predetermined portions in the case 310. At this time, the detent projections 323 and 323 of the cylindrical member 320 are slidably positioned in engaging concave portions 311 and 311 formed to be extended longitudinally in the case 310.

In the horizontal driving shaft 242, the screw piece 242a is screwed into the screw hole 241c of the slider 241 in the actuator 20.

A tip portion 243a having an almost rectangular section of a flexible wire 243 is fitted and fixed into the coupling hole 242b of the horizontal driving shaft 242. Moreover, a tip portion 233a having an almost rectangular section of a flexible wire 233 is fitted and fixed into the coupling hole 232b of the worm gear 232 in the rotation driving mechanism 230. A rear end of the flexible wire 243 is coupled to an aiming operating portion 40 shown in FIG. 3. The aiming operating portion 40 is connected to an operating member 410 supported rotatably on a rear surface wall 114 of a lamp body, for example. A cross groove 411 is formed on a rear surface of the operating member 410 and is caused to face rearward from a facing hole 114a formed on the rear surface wall 114 of the lamp body. Therefore, when a tip portion 510 of a plus driver 50 is engaged with the cross groove 411 of the operating member 410 to rotate the plus driver 50, for example, the operating member 410 is rotated, and furthermore, the rotation of the operating member 410 is transmitted to the horizontal driving shaft 242 through the flexible wire 243. Consequently, the slider 241 of the actuator 20 is moved in a longitudinal direction. More specifically, the output portion 220 is moved in the longitudinal direction. A rear end of the flexible wire 233 fitted and fixed into the coupling hole 232b of the worm gear 232 in the rotation driving mechanism 230 is also connected to the same aiming operating portion (not shown) as the aiming operating portion 40, when the flexible wire 233 is rotated, accordingly, the worm gear 232 is rotated so that the output shaft 220 is rotated.

In a leveling regulation, that is, an execution of a vertical change in an irradiating direction in the middle of running, moreover, when a stepping motor constituted by the rotor 330 and the stator 340 is operated, that is, a driving current is supplied to a stator coil (not shown) of the stator 340 so that the rotor 330 is rotated, the cylindrical member 320 screwed there into is prevented from being rotated by the engagement of the detent projections 323 and 323 and the engaging concave portions 311 and 311 and is moved forward or rearward corresponding to a rotating direction of the rotor 330. The horizontal driving shaft 242 integrated with the cylindrical member 320 is also moved integrally with the cylindrical member 320 in a longitudinal direction. Accordingly, the slider 241 of the actuator 20 is moved in the longitudinal direction.

When the output portion 220 of the actuator 20 is coupled to an actuator coupling portion 134 of a lamp unit 130, therefore, the lamp unit 130 is tilted in a transverse direction by the driving operation of the rotation driving mechanism 230 and the lamp unit 130 is tilted in a vertical direction by the driving operation of the horizontal driving mechanism 240. By the driving operation of the leveling driving portion 30, similarly, the lamp unit 130 is tilted in the vertical direction.

Figure 7:
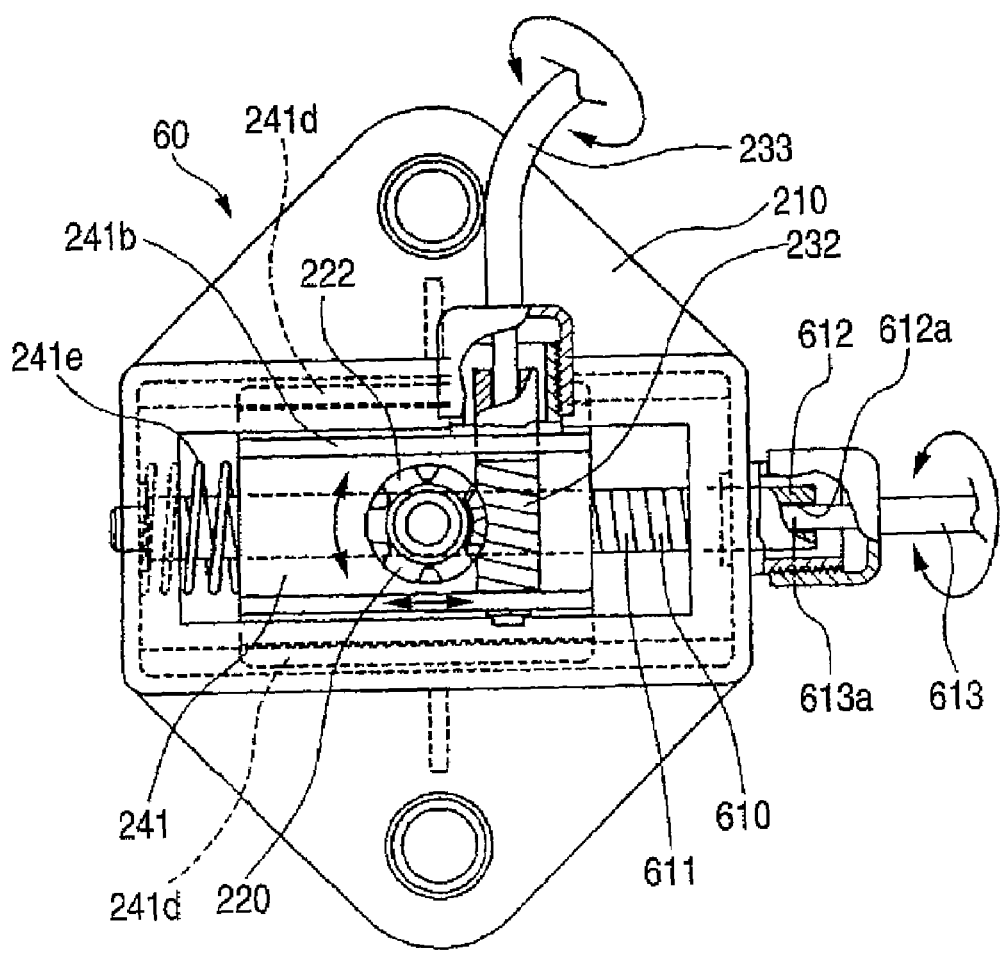
FIG. 7 is a schematic plan view showing a third embodiment of the actuator.

FIG. 7 shows a third embodiment of the actuator.

An actuator 60 according to the third embodiment is different from the actuator 20 according to the second embodiment in that a leveling driving portion 30 is not provided. More specifically, in the actuator 60, a horizontal driving shaft 610 and a support structure thereof are different from the horizontal driving shaft 242 of the actuator 20 and the other portions are the same as in the actuator 20. Accordingly, only the difference will be described in detail, and the other portions have the same reference numerals as those of the actuator and description will be omitted.

The horizontal driving shaft 610 is constituted by a screw shaft portion 611 having a screw piece formed on an outer peripheral surface and a coupling portion 612 formed integrally with a rear end of the screw shaft portion 611. The coupling portion 612 is provided with a coupling hole 612a having a rectangular section. The horizontal driving shaft 610 is supported on a case 210 in such a manner that it can be rotated in a direction extended in a longitudinal direction and a movement in the longitudinal direction is disabled. The coupling hole 612a of the coupling portion 612 is caused to face rearward and a tip portion 613a having a rectangular section in a flexible wire 613 to be rotated from an outside is fitted and fixed into the coupling hole 612a.

Accordingly, when the flexible wire 613 is operated by an operating portion such as the aiming operating portion 40 and is thus rotated from an outside, for example, the horizontal driving shaft 610 coupled thereto is rotated so that a slider 241 is moved in the longitudinal direction along the horizontal driving shaft 610 and an output shaft 220 supported on the slider 241 is moved in the longitudinal direction. By the movement in the longitudinal direction of the output shaft 220, a lamp unit is tilted vertically.

Although there has been described the example in which the horizontal driving shaft and worm gear and the aiming operating portion are linked to each other through the flexible wire in the second and third embodiments, it is also possible to employ a structure in which a coupling portion of the horizontal driving shaft and the worm gear is extended straight and can be directly operated by a jig such as a plus driver or can be operated through an orthogonal transforming gear in the case in which the aiming operating portion can be disposed close to the actuator.

While description has been made in connection with an exemplary embodiment of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS AND SIGNS

10 . . . headlamp for car (lighting device for vehicle), 101 . . . lamp housing, 110 . . . lamp body, 120 . . . transparent cover, 130 . . . lamp unit, 140 . . . actuator (optical axis regulating device), 141 . . . case, 142 . . . output portion, 144 . . . slider, 145 . . . motor (driving source), 20 . . . actuator (optical axis regulating device), 210 . . . case, 220 . . . output portion, 230 . . . rotation driving mechanism (transverse regulating means), 232 . . . worm gear (transverse regulating means, gear member), 240 . . . horizontal driving mechanism (vertical driving means), 241 . . . slider, 241c . . . screw hole, 242 . . . horizontal driving shaft (vertical driving means, ball screw member) , 310 . . . case, 330 (rotor)-340 (stator) . . . driving source, 60 actuator (optical axis regulating device), 610 . . . horizontal driving shaft (vertical driving means, ball screw member)

What is claimed is:

1. An optical axis regulating device of a lighting device for a vehicle, which serves to vertically and transversely tilt a lamp unit supported on one fulcrum in a lamp housing formed by a lamp body and a transparent cover for covering an opening portion of the lamp body, comprising:
    a case;
    a slider movable in a longitudinal direction with respect to the case;
    an output portion rotatably disposed on the slider and coupled to the lamp unit;
    vertical regulating means for moving the slider in the longitudinal direction; and
    transverse regulating means for rotating the output portion.

2. The optical axis regulating device of a lighting device for a vehicle according to claim 1, wherein the lighting device serves to support one of an upper end and a lower end of the lamp unit, wherein the lamp unit comprises a light source and serves to forward irradiate light of the light source, wherein the optical axis regulating device is disposed in the lamp housing, and wherein the other one of the upper end and the lower end of the lamp unit is coupled to the output portion.

3. An optical axis regulating device of a lighting device for a vehicle, which serves to vertically and transversely tilt a lamp unit supported on one fulcrum in a lamp housing formed by a lamp body and a transparent cover for covering an opening portion of the lamp body, comprising:
    a case;
    a slider movable in a longitudinal direction with respect to the case;
    an output portion rotatably disposed on the slider and coupled to the lamp unit;
    vertical regulating means for moving the slider in the longitudinal direction; and
    transverse regulating means for rotating the output portion,
    wherein the transverse regulating means comprises a gear member supported on the slider rotatably around an axis orthogonal to a rotating axis of the output portion and mated with a gear portion formed in the output portion.

4. The optical axis regulating device of a lighting device for a vehicle according to claim 3, wherein the vertical regulating means is a ball screw member extended in a longitudinal direction of the vehicle, rotatably supported on the case, and screwed into a screw hole formed on the slider.

5. The optical axis regulating device of a lighting device for a vehicle according to claim 3, wherein the lighting device serves to support one of an upper end and a lower end of the lamp unit, wherein the lamp unit comprises a light source and serves to forward irradiate light of the light source, wherein the optical axis regulating device is disposed in the lamp housing, and wherein the other one of the upper end and the lower end of the lamp unit is coupled to the output portion.

6. An optical axis regulating device of a lighting device for a vehicle, which serves to vertically and transversely tilt a lamp unit supported on one fulcrum in a lamp housing formed by a lamp body and a transparent cover for covering an opening portion of the lamp body, comprising:
    a case;
    a slider movable in a longitudinal direction with respect to the case;
    an output portion rotatably disposed on the slider and coupled to the lamp unit;
    vertical regulating means for moving the slider in the longitudinal direction; and
    transverse regulating means for rotating the output portion,
    wherein the vertical regulating means is a ball screw member extended in a longitudinal direction of the vehicle, rotatably supported on the case, and screwed into a screw hole formed on the slider.

7. The optical axis regulating device of a lighting device for a vehicle according to claim 6, wherein the ball screw member is moved in the longitudinal direction of the vehicle by means of a driving source driven by a manual and/or automatic operation from a remote place.

8. The optical axis regulating device of a lighting device for a vehicle according to claim 7, wherein the lighting device serves to support one of an upper end and a lower end of the lamp unit, wherein the lamp unit comprises a light source and serves to forward irradiate light of the light source, wherein the optical axis regulating device is disposed in the lamp housing, and wherein the other one of the upper end and the lower end of the lamp unit is coupled to the output portion.

9. The optical axis regulating device of a lighting device for a vehicle according to claim 6, wherein the lighting device serves to support one of an upper end and a lower end of the lamp unit, wherein the lamp unit comprises a light source and serves to forward irradiate light of the light source, wherein the optical axis regulating device is disposed in the lamp housing, and wherein the other one of the upper end and the lower end of the lamp unit is coupled to the output portion.

* * * * *